Jan. 3, 1956

W. J. HUGHES 2,729,232

CONTROLLER

Filed Nov. 3, 1951

INVENTOR.
Walter J. Hughes
BY

Agent

United States Patent Office 2,729,232
Patented Jan. 3, 1956

2,729,232

CONTROLLER

Walter J. Hughes, Tucson, Ariz., assignor to Infilco Incorporated, Tucson, Ariz., a corporation of Delaware Application November 3, 1951, Serial No. 254,697

9 Claims. (Cl. 137—487)

This invention relates to a system for controlling the operation of a flow control valve and more particularly to air pressure operated control means for such a valve.

It is an object of this invention to provide means for automatically opening and closing a regulating or control valve in response to the opening and closing, respectively, of a shutoff valve downstream or upstream of the regulating valve.

Another object is to provide remote control means for regulating the rate of flow through a valve.

Another object is to provide pneumatically operated means for controlling the wash rate of a filter, or the rate of effluent from a filter, to maintain a predetermined value.

Another object is to provide in a device of this general type positive means for closing the control valve when a shutoff valve downstream or upstream is closed, whereby a filter wash flow or effluent flow is controlled from valve closed, or zero flow, position upwardly, rather than from valve open position downwardly to the predetermined flow rate.

Other objects will become apparent upon consideration of the description and claims which follow.

The main parts of the system controlling the operation of the control valve are a pneumatically operated double piston motor in driving connection with the valve, pressure fluid connections for applying to the opposite pistons of the motor a rating pressure and a controlled air pressure varying as a function of the flow to be controlled, and a shifting or switch device for the application of said pressures and adapted to automatically shift the rating pressure to the valve closing piston of the control valve motor when the shutoff valve is closed.

The invention is particularly suitable for use with a balanced iris type flow control valve, such as the valve shown in my Patent No. 2,307,273, and will be described as applied to such a valve. However, it will be understood that the invention is not limited to use with any particular type of flow control valve. The valve positioning pneumatically operated double piston motor may be of the type described in my copending application Serial No. 187,591, now Patent No. 2,630,132. The invention will be more readily understood by reference to the drawings wherein like reference characters in the same figures designate similar elements.

Figure 1:
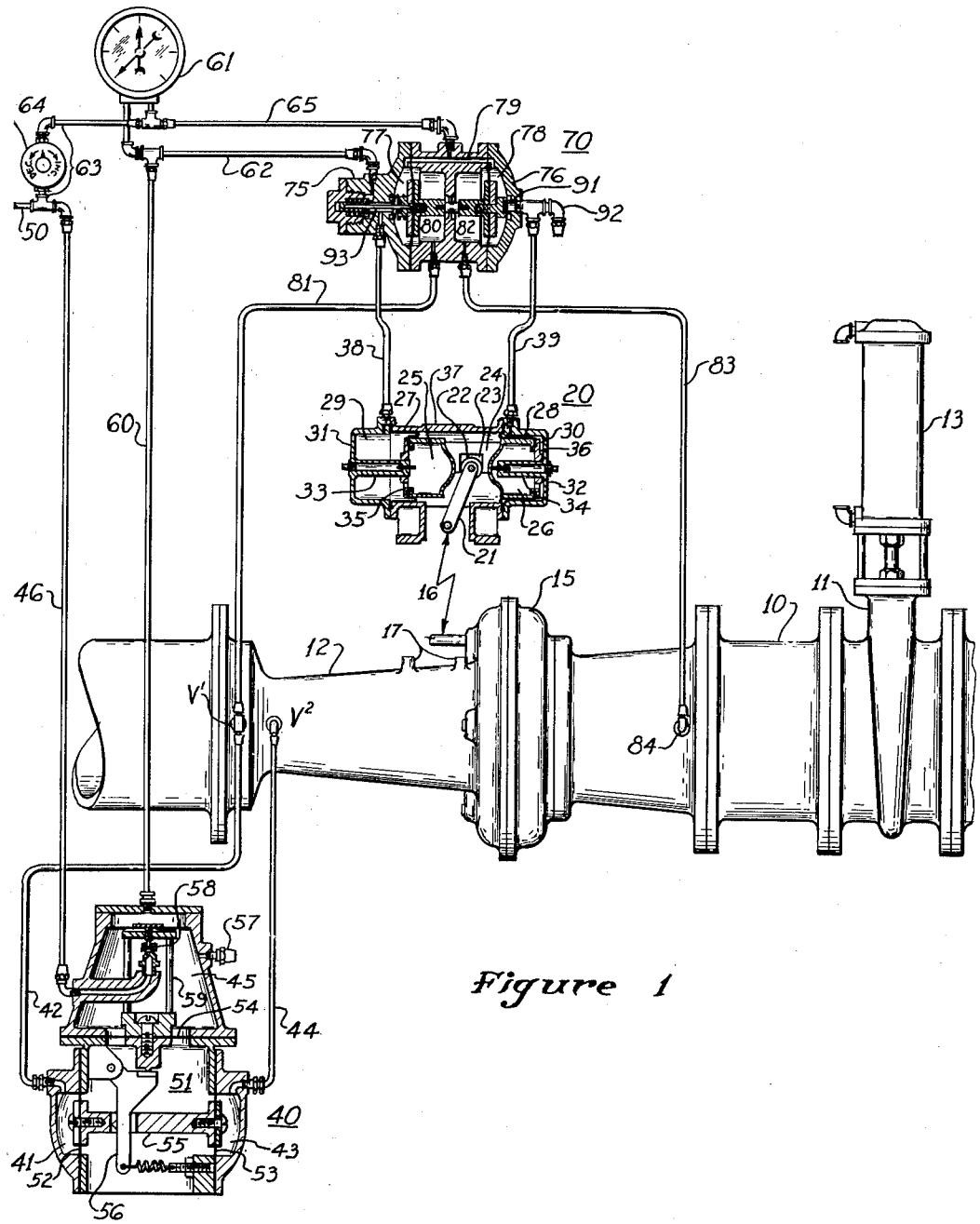
Figure 1 is a diagrammatic view, partly in section, of a system according to the invention as applied to a filter wash controller.

In Figure 1 the wash water conduit 10 is provided with a wash water valve 11 downstream of a venturi tube 12. As is usual in the art, the wash water valve 11 is a simple shutoff valve, such as a gate valve, and is operated by any suitable means, such as the hydraulic cylinder 13 shown.

The operation of the valve 11 may be instigated manually or automatically by any suitable means. Such means are well known in the art and are, therefore, not shown or described herein.

A flow control valve 15 is installed in usual manner on the conduit 10, preferably closely behind the throat of the venturi tube 12. The control valve 15 is preferably of the four vane iris type shown fully in my Patent No. 2,307,273, and will, therefore, not be described in detail herein. The valve 15 is dynamically balanced so that it tends neither to open nor to close in its operating positions.

The operating stem of the valve 15 is shown at 16. Bosses 17 are provided for mounting the operating motor 20. The motor 20 is shown for purposes of clarity separately from the controller and in a different plane.

The operating stem 16 of the control valve 15 is positioned by a crank 21 keyed to the stem. The upper end of crank 21 is forked and carries a roller 22 suitably pinned in the fork. The roller 22 rides in a slot 23 of a narrow strut member 24, which integrally joins the two pistons 25 and 26 of the valve positioning motor 20. Stocking or roller type diaphragms 27 and 28 seal the pistons to their operating chambers 29 and 30. The end caps 31 and 32 forming the chambers 29 and 30 are fitted with guide members 33 and 34, on which the pistons travel. Diaphragms 27 and 28 are locked with their inner edges to the pistons by plates 35 and 36 and are clamped with their outer edges between the flanges of the frame 37 of the motor 20 and the flanges of the end caps 31 and 32, as shown. Air pressure is conveyed to chambers 29 and 30 through lines 38 and 39, respectively. Any small difference in the pressures prevailing in chambers 29 and 30 is sufficient to move the piston assembly and thereby alter the throttling position of the control valve 15, movement of the pistons to the right, as seen in Figure 1, tending to close valve 15, and, reversely, movement of the pistons to the left tending to open valve 15.

The pressure differential derived from the venturi tube 12 is converted by a pneumatic converter 40 to a proportional controlled air pressure within a predetermined range. The converter 40 comprises a high pressure chamber 41 connected to the inlet part $V^1$ of the venturi tube by a conduit 42, a low pressure chamber 43 connected to the throat $V^2$ of the venturi tube by a conduit 44, and a controlled air pressure chamber 45 connected by a conduit 46 to an air supply conduit 50 which supplies air from a suitable source under substantially constant pressure, say of 15 p. s. i. (pounds per square inch), to the system. The chambers 41, 43, and 45 are closed off from the atmospheric chamber 51 within the frame of the converter by diaphragms 52, 53, and 54, respectively. Diaphragms 52 and 53 are rigidly connected by a strut member 55, which is slotted to pass the vertical leg of a bell crank lever 56, as shown. Force derived from the pressure differential applied to the diaphragms 52 and 53 is transmitted by the crank 56 to the underside of the diaphragm 54.

Controlled air pressure chamber 45 is provided with a small escapement port 57. Flow of air from conduit 46 to the chamber 45 is controlled by an air inlet valve 58, mounted on a yoke 59 attached to the keeper plates of diaphragm 54. Any force acting on the underside of diaphragm 54 lifts the yoke 59 and opens the air inlet valve 58 to admit air into the air chamber 45 and build up air pressure therein until the differential force derived from diaphragms 52 and 53 and acting upwardly on diaphragm 54 is balanced by the force of the air pressure acting downwardly thereon. Thus, a continuous measuring pressure is obtained of the force derived from diaphragms 52 and 53, and thus a measure of the flow head from the venturi tube.

Normally the rate of wash has a predetermined maximum value and a minimum value about half of the maximum or a range of 2 to 1. Thus, the venturi heads vary over a range of 4 to 1, since the heads vary as the square of the flow values. By proper proportioning of the areas of the diaphragms 52 and 53, the ratios of the levers of the bell crank 56, and the area of the diaphragm 54, the range of wash flows can be measured by a range of air pressures in the chamber 45 up to say, for example, 5 p. s. i. for the maximum. Then at ½ maximum rate, the measuring pressure is 1¼ p. s. i. or ¼ the maximum.

The converter described above is known in the art and is not claimed herein.

The rate of wash flow measuring pressure derived from the converter is conveyed by a line 60 leading from the controlled air pressure chamber 45 to a duplex pressure gauge 61, whose one hand shows the wash rate attained. It is also conveyed by a branch line 62 to a shifter instrument or switch to be described below, which controls the operation of the valve positioning motor 20.

A branch conduit 63 connects the supply air conduit 50 to a manually set pressure regulator 64 and to the duplex pressure gauge 61. The pressure regulator 64 is set to the desired rating pressure by observing the value so set, as shown by the second hand of the duplex gauge 61. The rating pressure value set manually at the regulator 64 and observed on the gauge 61 is over the same range of 0 to 5 p. s. i. as derived from the converter 40 in measuring the value of the wash flow. Thus, any two rating and rate measuring pressures are balanced in the same ranges.

Figure 2:
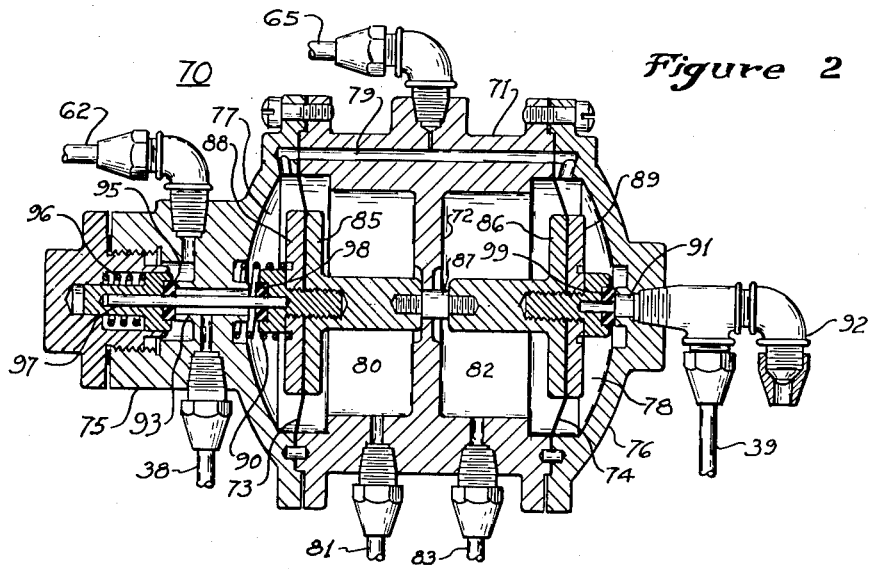
Figure 2 is an enlarged vertical section through the shifting or switch device of the system of Figure 1.

The rating pressure set by the regulator 64 is conveyed by a rating pressure conduit 65 to the shifter or switch 70. The shifter 70, best shown in Figure 2, comprises a housing 71, formed with an integral partition 72. The open ends of the housing 71 are closed by diaphragms 73 and 74 of equal effective area, clamped to the flanges of the housing 71 by flanged end caps 75 and 76. The chambers 77 and 78 formed by diaphragm 73 and end cap 75, and by diaphragm 74 and end cap 76, respectively, are connected by a common port 79, which in turn is connected to the rating pressure conduit 65. As shown in Figure 1, the chamber 80 formed between the partition 72 and diaphragm 73 is connected to conduit 10 at the venturi inlet $V^1$ by a conduit 81, and the chamber 82 on the other side of the partition 72 is connected by a conduit 83 to a point on conduit 10 downstream of the control valve 15 and upstream of the shutoff valve 11, as at 84. The diaphragms 73 and 74 are rigidly connected to each other by means of plates 85 and 86 and a strut member 87. The strut 87 passes through a clearance opening in the partition 72. Outer diaphragm plates 88 and 89 are formed with bosses. A spring 90 encircles the boss of plate 88 and tends to move the diaphragm assembly to the right, as seen in the figures. The force of spring 90 is chosen to be smaller than the smallest actual force derived from the pressure drop across the control valve 15 in product with the area of the diaphragms 73 and 74, so that the spring will be effective to move the diaphragm assembly only upon closing of the shutoff valve 11, when the pressures at $V^1$ and 84 are both equal to the static pressure in the line 10.

End cap 76 is provided with a port 91, which is connected to the conduit 39 leading to the operating chamber 30 of the valve opening piston 26 of motor 20, and is also connected to an escapement 92. End cap 75 is provided with an elongated port 93, which is connected intermediate its ends to the conduit 38 leading to the operating chamber 29 of the valve closing piston 25 of motor 20, and also is connected with its outer end to the branch line 62 of the measuring pressure conduit 60. A valve 95 is provided for the outer end of port 93 and is urged towards closed position by a spring 96. A pusher pin 97 is fixed to the diaphragm assembly and extends through the port 93 and is slidable in a bore in the body of the valve 95.

Valves 98 and 99 are associated with the inlet ends of ports 93 and 91, respectively, and are affixed to the bosses of plates 88 and 89, respectively, the construction being such that when valve 98 is seated on its port 93, valve 99 and valve 95 are open, and vice versa.

When the wash water valve 11 is closed at the end of a filter wash, valve 15 being a non-tight closing regulating valve, the pressures at $V^1$ and 84 are both equal to the static head in line 10, as are also the pressures in chambers 80 and 82. With chambers 77 and 78 both connected to rating pressure from rating pressure conduit 65, the pressures in these chambers are also equal. Since the diaphragms 73 and 74 have the same effective area and are acted upon by equal pressures, no force is derived from these pressures to move the diaphragm system in either direction. Under this condition the force of the spring 90 is sufficient to shift the diaphragm system to the right to seat valve 99 on port 91 and thereby cut off the connection between chamber 78 of the shifter and operating chamber 30 of the valve opening piston 26. Chamber 30 remains connected to escapement 92. Thus, rating pressure is cut off from chamber 30, and air trapped in chamber 30 can escape therefrom through escapement 92.

Simultaneously with the seating of valve 99, valve 98 is unseated from its port, and rating pressure from chamber 77 thereby admitted through line 38 to the operating chamber 29 of the valve closing piston 25 of the valve motor 20, providing a force to move the pistons 25 and 26 to the right and close the valve 15. Thus, upon closing of the shutoff valve 11, the control valve is automatically closed and remains closed as long as the non-operating condition continues. This is highly desirable in order to avoid a damaging rush of wash water to the filter when the wash water valve 11 is opened to start a filter wash operation.

Simultaneously with the closing of valve 99 and opening of valve 98, the pusher pin 97 is moved to the right and releases the spring 96 of valve 95, whereupon the valve 95 closes under the action of its spring 96. This prevents backflow of rating pressure from port 93 through line 62 to the measuring pressure side of duplex gauge 61 and through line 60 to the converter 40.

In the non-flow position of the instrument the measuring pressure side of gauge 61 indicates the zero pressure prevailing in converter 40. The rating pressure derived from air pressure line 50 and set to a desired value at regulator 64 is maintained at all times and is changed in value only when a new wash rate is desired.

When the wash water valve 11 is opened to start a filter wash operation, there is an immediate drop in pressure across the closed control valve 15, which unbalances the pressure at the points $V^1$ and 84 and also in chambers 80 and 82 of the shifting device 70, the pressure at $V^1$ and in chamber 80 being higher. In response to this unbalance of pressures the diaphragm assembly of shifter 70 moves to the left, overcoming the force of spring 90, and closes valve 98 and opens valve 99, and also opens valve 95 by forcing the pusher pin 97 to the left. This switches the rating pressure instantaneously from chamber 29 of the valve motor 20 to chamber 30, where it acts to move the pistons 25 and 26 to the left in valve opening direction. Air previously trapped in chamber 29 escapes through line 38, open valve 95, lines 62 and 60, air pressure chamber 45, and escapement 57, but prevents a sudden opening of the valve due to the shifting of the rating pressure.

As the valve 15 opens and the wash flow begins, the flow head derived from the venturi acts on the diaphragm 54 of converter 40, opening the air valve 58 to build up air pressure in chamber 45 and send a measuring pressure from the converter to the duplex gauge, where its value is indicated, and also through line 62, open valve 95, port 93 and line 38 to piston chamber 29. This flow head measuring air pressure applied to piston 25 opposes the rating pressure applied to piston 26. When the value of the measuring pressure reaches the value of the rating pressure, the valve opening movement of the pistons ceases, and the control valve 15 remains in the then position, which corresponds to the rated wash flow. If any increase in wash flow over the set rate occurs, the measuring pressure in piston chamber 29 will overbalance the rating pressure in chamber 30 and move the pistons in valve closing direction until equilibrium is reached, and vice versa, decrease of the wash flow below the set rate will act on the pistons in valve opening direction.

When the filter washing is completed and the wash water valve 11 is closed (manually or automatically), the control valve 15 is automatically reset to closed position by the action of the spring 90, as described above.

It will be seen that my new wash flow controller automatically and instantaneously starts opening the control valve upon opening of the wash water valve, maintains a sensitive automatic control of the rate of the wash flow during filter washing, and automatically resets the control valve to its closed position upon termination of the washing operation.

Figure 3:
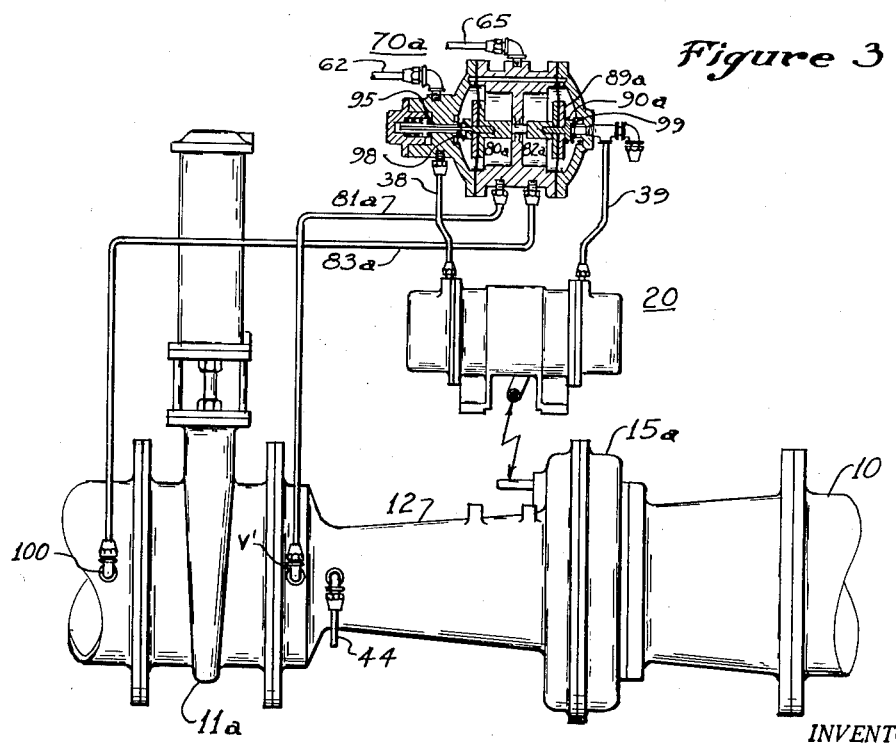
Figure 3 is a diagrammatic partial view of a system according to the invention as applied to an effluent controller.

Figure 3 shows the invention as applied to an effluent controller. The system is generally the same as that of Figure 1, except that the position of certain parts is reversed. Thus, the shutoff valve 11a, being in this case an effluent valve, is upstream of the control valve 15a and of the venturi 12. The converter and gauge and their pressure connections are the same as in Figure 1 and are not shown in Figure 3. The valve motor 20, shown in Figure 3 in elevation, is identical with the motor 20 described in connection with Figure 1. The shifter or switch 70a also is generally the same as the shifter 70 of Figure 1 and is connected to the conduits 62 and 65 and to valve motor 20 in the same manner. However, in this form of the invention the spring 90a encircles the boss of diaphragm plate 89a and tends to move the diaphragm assembly to the left. As in Figure 1, the chamber 80a of shifter 70a is connected to conduit 10 at $V^1$ by a conduit 81a; but the chamber 82a in this embodiment is connected to conduit 10 by a conduit 83a at a point 100 upstream of shutoff valve 11a.

With this construction, when the shutoff valve 11a is closed, a drop in pressure between the upstream and downstream sides of the valve 11a occurs, and consequently pressure in chamber 82a, connected to point 100, will be higher than pressure in chamber 80a, connected to $V^1$. The diaphragm system, therefore, moves to the right and closes valves 99 and 95 and opens the valve 98. This switches the rating pressure from the valve opening piston 26 of motor 20 to the valve closing piston 25 to close the control valve 15a, as described in connection with Figure 1.

When the effluent valve 11a is opened, the pressures upstream and downstream of valve 11a, and therefore also in chambers 80a and 82a, are equalized. This permits the spring 90a to move the diaphragm assembly to the left, opening valves 99 and 95 and closing valve 98, thereby switching the rating pressure back to the valve opening piston of the valve motor 20. Opening of the valve 95 of the shifter establishes connection between measuring pressure conduit 62 and piston chamber 29 of the left hand or valve closing piston of motor 20 to admit thereto a measuring pressure varying as a function of the flow to be controlled, and thus control the position of the valve 15a to the set flow value, as described in connection with Figure 1.

Thus, also in this application of the invention the control valve begins to open immediately upon opening of the shutoff valve, the effluent flow rate is automatically and accurately controlled, and the control valve automatically reset to closed position upon closing of the shutoff valve.

I claim:

1. An automatic switch for the application of fluid pressure to a pneumatically operated motor positioning a valve controlling flow through a conduit, to open and close the valve in response to opening and closing, respectively, of a shutoff valve in the conduit, said switch comprising a pressure sensitive means, means for continuously applying to said pressure sensitive means a pressure varying with the loss in pressure across one of said valves and urging said pressure sensitive means into one direction, mechanical means for applying a mechanical force to said pressure sensitive means urging it in the opposite direction, a pair of fluid pressure lines adapted to transmit fluid pressures to said motor, means for applying a rating pressure to said lines, means for connecting one of said fluid pressure lines to a source of measuring pressure varying as a function of the flow to be controlled, and valve means positioned in unison by movement of said pressure sensitive means to admit measuring pressure to said one fluid pressure line, and rating pressure to the other, and positioned by a reverse movement of said pressure sensitive means to cut off rating pressure from said other fluid pressure line and switch it to said one line and simultaneously cut off measuring pressure from said one line.

2. An automatic switch for operating a valve motor to position a valve controlling flow through a conduit, to open and close the valve in response to opening and closing, respectively, of a shutoff valve on the conduit, said switch comprising two spaced rigidly connected diaphragms, means for continuously applying to the sides of said diaphragms facing each other two pressures whose difference corresponds to the drop in head across one of said valves, a spring acting on said diaphragms in opposition to the force difference between said pressures, a pair of fluid pressure lines adapted to transmit fluid pressures to said motor, means for connecting said fluid pressure lines to a source of predetermined rating pressure, means for connecting one of said fluid pressure lines to a source of measuring pressure varying as a function of the flow to be controlled, and valve means regulating flow of fluid through said fluid pressure lines, said valve means being positioned by movement of said diaphragms in one direction to admit measuring pressure to said one fluid pressure line and rating pressure to the other, and positioned by movement of said diaphragms in the other direction to cut off said one line from said measuring pressure and said other line from rating pressure and switch said rating pressure to said one line.

3. An automatic switch controlling the application of fluid pressure to a pneumatically operated motor positioning a valve controlling flow through a conduit, to open and close the valve in response to opening and closing, respectively, of a shutoff valve in the conduit, said switch comprising a pair of pressure chambers, each of said chambers being sealed by pressure sensitive means, said pressure sensitive means being spaced from each other and rigidly connected to move in unison, means for continuously applying to said pressure sensitive means a pressure varying with the loss in pressure across one of said valves and urging said pressure sensitive means to move in one direction, mechanical means for applying a mechanical force to said pressure sensitive means urging them in the opposite direction, means for applying a rating pressure in said pressure chambers, a pair of fluid pressure lines connected to said pressure chambers and adapted to transmit fluid pressures to said motor, means for connecting one of said fluid pressure lines to a source of a measuring pressure varying as a function of the flow to be controlled, and valve means positioned in unison by movement of said pressure sensitive means to open the connection of said one fluid pressure line to said source of measuring pressure and close its connection with its pressure chamber, and to open the connection of the other fluid pressure line to its pressure chamber, and positioned by a reverse movement of said pressure sensitive means to cut off said other fluid pressure line from its pressure chamber and simultaneously cut off measuring pressure from said one line and connect said one line with its pressure chamber.

4. A switch controlling admission of pressure fluid to a pneumatically operated valve motor for a valve controlling flow through a conduit, to open and close the valve in response to opening and closing, respectively, of a shutoff valve in the conduit, said switch comprising a casing, a pair of spaced rigidly connected diaphragms forming in opposite end portions of said casing two pressure chambers, said pressure chambers being continuously connected to a source of rating pressure, means for applying in the space within said casing between said diaphragms a pressure varying with the loss in pressure across one of said valves, mechanical means acting on said diaphragms in opposition to said last mentioned pressure, fluid pressure lines connected to said diaphragm chambers and adapted to transmit fluid pressures to said valve motor, means for connecting one of said fluid pressure lines to a source of pneumatic measuring pressure varying as a function of the flow to be controlled, and valve means positioned by movement of said diaphragms in one direction to admit measuring pressure to said one fluid pressure line and simultaneously admit rating pressure to said other fluid pressure line, and by movement of said diaphragms in the opposite direction to cut off rating pressure from said other fluid pressure line and switch it to said one fluid pressure line, and simultaneously cut off the measing pressure from said one line.

5. Automatic means for operating the valve motor of a flow control valve, to open and close the valve in response to opening and closing of a shutoff valve, said means including a pair of fluid pressure lines adapted to transmit fluid pressures to said motor, means for connecting said fluid pressure lines to a source of a predetermined rating pressure, means for connecting one of said fluid pressure lines to a source of a measuring pressure varying as a function of the flow to be controlled, valve means operatively connected with said fluid pressure lines, and valve positioning means connected to said valve means, said valve positioning means including a pressure sensitive member, means for applying to said member a pressure varying as the drop in pressure through one of said valves and urging said member to move in one direction, and mechanical means urging said member to move in the opposite direction, said valve means being positioned by movement of said member to connect said one fluid pressure line to said source of measuring pressure and to simultaneously connect the other fluid pressure line to said source of rating pressure, and being positioned by a reverse movement of said member to cut off the rating pressure from said other fluid pressure line, and to switch it to said one fluid pressure line and simultaneously cut off said one line from said source of measuring pressure.

6. Automatic means for operating a pneumatic valve motor positioning a flow control valve, to close and open said valve upon closing and opening, respectively, of a wash water valve downstream thereof, said means comprising a pair of fluid pressure lines adapted to transmit fluid pressures to said motor in valve opening and valve closing directions, respectively, said lines being connected to a source of rating pressure and the line transmitting fluid pressure in valve closing direction also being connected to a source of measuring pressure varying as a function of the flow to be controlled, valve means regulating the application of rating and measuring pressure to said fluid pressure lines, a pressure responsive means for positioning said valve means, means to apply the pressure loss across said control valve to said pressure responsive means to position said valve means to admit rating pressure to the valve opening fluid pressure line and measuring pressure to the valve closing fluid pressure line, and a spring connected to said pressure responsive means and effective when the said pressure loss is zero to position said valve means to switch the rating pressure from the valve opening to the valve closing fluid pressure line and cut off the measuring pressure from the valve closing fluid pressure line.

7. A switch for operating a valve motor positioning a flow control valve, to open and close the valve in response to opening and closing, respectively, of a shutoff valve downstream of the control valve, said switch comprising pressure sensitive means, a pair of fluid pressure lines connected to said switch and adapted to transmit pressures to said valve motor in valve closing and valve opening direction, respectively, means for applying to said pressure sensitive means a force varying as the pressure drop across said control valve, mechanical means for applying to said pressure sensitive means a force opposing said first force, means for admitting to said fluid pressure lines a predetermined rating pressure, means for admitting to one of said fluid pressure lines a measuring pressure varying as a function of the flow to be controlled, and valve means positioned by movement of said pressure sensitive means in response to said first force to admit in unison rating pressure to the fluid pressure line transmitting fluid pressure in valve opening direction and measuring pressure to the fluid pressure line transmitting fluid pressure in valve closing direction, and positioned by movement of said pressure sensitive means in response to said mechanical force to cut off rating pressure from the fluid pressure line transmitting valve opening pressure and switch it to the line transmitting valve closing pressure.

8. Means for controlling admission of pressure fluid to a pneumatically operated valve motor for a flow control valve, to open and close the valve in response to opening and closing, respectively, of a wash water valve downstream thereof, said means comprising a housing, two opposed rigidly connected diaphragms forming in the opposite ends of said housing two diaphragm chambers, said chambers being connected to a source of a predetermined rating pressure, a partition in said housing forming between said diaphragms two compartments, means for applying to one of said compartments a pressure corresponding to that in the conduit upstream of said control valve and to the other compartment a pressure corresponding to that in the conduit downstream of said control valve, any difference in said pressures urging said diaphragms in one direction, a spring urging said diaphragms in the opposite direction, a pair of fluid pressure lines adapted to transmit fluid pressures to the valve motor in valve opening and valve closing direction, respectively, a port connecting one of said diaphragm chambers to the fluid pressure line transmitting pressure in valve opening direction, a second port connecting the other diaphragm chamber to the other fluid pressure line, said second port also connecting said other fluid pressure line to a source of measuring pressure varying as a function of the flow to be controlled, valves positioned by movement of said diaphragms in response to a difference in the pressures acting in said compartments to open in unison the connection between said first diaphragm chamber and said valve opening fluid pressure line and the connection between said valve closing fluid pressure line and said source of measuring pressure, and simultaneously to close the connection between said second diaphragm chamber and said valve closing fluid pressure line, and positioned by movement of said diaphragms by said spring to open said connection between said second diaphragm chamber and the valve closing fluid pressure line and simultaneously close in unison the connection between said first diaphragm chamber and the valve opening fluid pressure line and the connection between the source of measuring pressure and the valve closing fluid pressure line.

9. Means for operating a valve motor positioning a valve controlling flow through a conduit, to open and close said valve in response to opening and closing, respectively, of a shutoff valve on the conduit upstream of the control valve, said means comprising a pressure sensitive member, means for applying to said member a pressure varying as the pressure drop across said shutoff valve and urging said member in one direction, mechanical means for applying to said member a force acting in the opposite direction, a pair of fluid pressure lines, means for connecting said lines to a source of predetermined rating pressure, means for connecting one of said lines to a source of measuring pressure varying as a function of the flow to be controlled, said fluid pressure lines being adapted to transmit fluid pressure to said valve motor in valve opening and valve closing direction, respectively, and valve means positioned by movement of said pressure sensitive member in response to said mechanical force to admit in unison rating pressure to the fluid pressure line transmitting fluid pressure in valve opening direction and measuring pressure to the line transmitting pressure in valve closing direction, and positioned by movement of said pressure sensitive member in response to said pressure drop to cut off rating pressure from the pressure line transmitting valve opening pressure and switch it to the pressure line transmitting valve closing pressure.

References Cited in the file of this patent
UNITED STATES PATENTS

| | | |
|---|---|---|
| 1,871,327 | Kuen | Aug. 9, 1932 |
| 2,146,176 | Donaldson | Feb. 7, 1939 |
| 2,451,029 | Hughes | Oct. 12, 1948 |
| 2,600,073 | Plank | June 10, 1952 |
| 2,630,132 | Hughes | Mar. 3, 1953 |
| 2,633,869 | Plank | Apr. 7, 1953 |